(12) United States Patent
Hosokawa

(10) Patent No.: US 10,073,667 B2
(45) Date of Patent: Sep. 11, 2018

(54) MULTI-MONITOR AND DISPLAY METHOD FOR MULTI-MONITOR

(71) Applicant: NEC Display Solutions, Ltd., Tokyo (JP)

(72) Inventor: Hiromi Hosokawa, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 1 day.

(21) Appl. No.: 14/786,131

(22) PCT Filed: Apr. 25, 2013

(86) PCT No.: PCT/JP2013/062193
§ 371 (c)(1),
(2) Date: Oct. 21, 2015

(87) PCT Pub. No.: WO2014/174630
PCT Pub. Date: Oct. 30, 2014

(65) Prior Publication Data
US 2016/0077787 A1    Mar. 17, 2016

(51) Int. Cl.
*G09G 5/00*     (2006.01)
*G06F 3/14*     (2006.01)

(52) U.S. Cl.
CPC .......... *G06F 3/1446* (2013.01); *G06F 3/1415* (2013.01); *G06F 3/1423* (2013.01);
(Continued)

(58) Field of Classification Search
CPC .... G06F 3/1446; G06F 3/1415; G06F 3/1423; G06F 3/1454; G09G 2370/16;
(Continued)

(56) References Cited

U.S. PATENT DOCUMENTS

| | | | |
|---|---|---|---|
| 6,583,771 B1* | 6/2003 | Furuhashi | G06F 3/1446 345/1.1 |
| 2007/0296643 A1* | 12/2007 | Ben-Shachar | G06F 3/1438 345/1.1 |
| 2011/0216082 A1* | 9/2011 | Caskey | G06F 3/1446 345/560 |

FOREIGN PATENT DOCUMENTS

| | | |
|---|---|---|
| JP | 10-283157 A | 10/1998 |
| JP | 2000-276099 A | 10/2000 |

(Continued)

OTHER PUBLICATIONS

International Search Report (ISR) (PCT Form PCT/ISA/210), in PCT/JP2013/062193, dated Aug. 6, 2013.

*Primary Examiner* — Matthew Sim
(74) *Attorney, Agent, or Firm* — McGinn IP Law Group, PLLC.

(57) ABSTRACT

A monitor device is one of a plurality of monitors connected in series. The monitor device includes: an acquisition unit that acquires the number of the monitors; a calculation unit that calculates a region to be displayed by the monitor device, of an image corresponding to an image signal, and a display size of an image corresponding to the region, based on the acquired number of the monitors and arrangement of the monitor device in the serial connection; a display unit that displays the image corresponding to the region according to the display size; and a communication unit that outputs the acquired number of the monitors to one of the monitors when the one of the monitors is arranged at a subsequent stage of the monitor device.

16 Claims, 9 Drawing Sheets

(52) U.S. Cl.
CPC ..... *G06F 3/1454* (2013.01); *G09G 2340/045* (2013.01); *G09G 2340/0464* (2013.01); *G09G 2354/00* (2013.01); *G09G 2356/00* (2013.01); *G09G 2370/042* (2013.01); *G09G 2370/16* (2013.01)

(58) Field of Classification Search
CPC ......... G09G 2340/045; G09G 2354/00; G09G 2356/00; G09G 2370/042; G09G 2340/0464
See application file for complete search history.

(56) References Cited

FOREIGN PATENT DOCUMENTS

| | | |
|---|---|---|
| JP | 2002-207247 A | 7/2002 |
| JP | 2003-044028 A | 2/2003 |
| JP | 2003-316339 A | 11/2003 |
| JP | 2009-271424 A | 11/2009 |
| JP | 2011-244356 A | 12/2011 |
| JP | 2012-124759 A | 6/2012 |
| JP | 2012-138712 A | 7/2012 |

* cited by examiner

MULTI-MONITOR AND DISPLAY METHOD FOR MULTI-MONITOR

TECHNICAL FIELD

The present invention relates to a multi-monitor in which a plurality of monitors are connected to each other to display one image as a whole, and a display method for the multi-monitor.

BACKGROUND ART

As a technique for connecting a plurality of monitors and displaying one image by these monitors, for example, there is the technique described in Patent Document 1.

At the time of displaying an image in such multi-connection, zoom display may also be performed. In a zooming method, for example, the same image is input to all the multi-configured monitors. Then an arbitrary grid-like pattern is displayed by an OSD (On-Screen Display) prepared beforehand on the respective monitors, to accept selection from a user. The respective monitors perform zoom display of an image corresponding to a region of the pattern selected for the own monitor of the grid-like pattern, matched with panel resolution. For example, as shown in FIG. 10, in a 2×2 multi-connected monitor including 2 monitors in a vertical direction and 2 monitors in a horizontal direction, a first monitor (reference symbol a) performs fourfold zoom display of a region on an upper left side of the whole image, which is divided into quarters, a second monitor (reference symbol b) performs fourfold zoom display of a region on an upper right side of the whole image, which is divided into quarters, a third monitor (reference symbol c) performs fourfold zoom display of a region on a lower left side of the whole image, which is divided into quarters, and a fourth monitor (reference symbol d) performs fourfold zoom display of a region on a lower right side of the whole image, which is divided into quarters. Consequently, one image can be displayed by the multi-connected four monitors (reference symbol e).

PRIOR ART DOCUMENT

Patent Document

[Patent Document 1] Japanese Unexamined Patent Application, First Publication No. H10-283157

SUMMARY OF THE INVENTION

Problem to be Solved by the Invention

In the above described monitor, it is necessary to perform an operation to select a region to be zoom displayed by the OSD on each of the respective monitors. Therefore if the number of monitors increases, the time required for these operations increases.

An object of the present invention is to provide a multi-monitor and a display method for the multi-monitor that can solve the above problem.

Means for Solving the Problem

The present invention provides a multi-monitor in which a plurality of monitors including a first monitor and a monitor other than the first monitor is connected in series, wherein a first monitor connected to a first stage of the plurality of monitors includes: a first acquisition unit that acquires the number of the monitors that are connected in series, from outside; a first calculation unit that calculates a region to be displayed by the own monitor, of an image corresponding to an image signal, and a display size of an image of the region to be displayed on the own display unit, based on the acquired number of the monitors and arrangement of the own monitor at time of the serial connection; a first display unit that displays an image of the region according to the display size; and a first communication unit that outputs the acquired number of the monitors to a monitor connected to a subsequent stage, and the monitor other than the first monitor of the plurality of monitors includes: a second acquisition unit that acquires information of the number of the monitors from a monitor connected to a previous stage; a second calculation unit that calculates a region to be displayed by the own monitor, of the image corresponding to the image signal, and a display size of an image of the region to be displayed on the own display unit, based on the number of the monitors acquired by the second acquisition unit and arrangement of the own monitor at time of the serial connection; a second display unit that displays the image of the region according to the display size according to the calculation result of the second calculation unit; and a second communication unit that, when there is a monitor connected to a subsequent stage, outputs the acquired number of the monitors to the monitor connected to the subsequent stage.

Moreover, the present invention provides a monitor device that can connect a plurality of monitors including a first monitor and monitors other than the first monitor in series, the monitor device including: an acquisition unit that acquires the number of the monitors to be connected in series from outside or from a monitor connected to a previous stage; a calculation unit that calculates a region to be displayed by the own monitor, of an image corresponding to an image signal, and a display size of an image of the region to be displayed on the own display unit, based on the acquired number of the monitors and arrangement of the own monitor at time of the serial connection; a display unit that displays the image of the region according to the display size; and a communication unit that, when there is a monitor connected to a subsequent stage, outputs the acquired number of the monitors to the monitor connected to the subsequent stage.

Furthermore, the present invention provides a display method for a multi-monitor, in a multi-monitor in which a plurality of monitors including a first monitor and a monitor other than the first monitor is connected in series, wherein the first monitor connected to a first stage: acquires the number of the monitors that are connected in series, from outside; calculates a region to be displayed by the own monitor, of an image corresponding to an image signal, and a display size of an image of the region to be displayed on the own display unit, based on the acquired number of the monitors and arrangement of the own monitor at time of the serial connection; displays an image of the region according to the display size; and outputs the acquired number of the monitors to a monitor connected to a subsequent stage, and the monitor other than the first monitor of the multi-monitor: acquires information of the number of the monitors from a monitor connected to a previous stage; calculates a region to be displayed by the own monitor, of the image corresponding to the image signal, and a display size of an image of the region to be displayed on the own display unit, based on the acquired number of the monitors and arrangement of the own monitor at the time of the serial connection; displays the image of the region according to the display size; and when there is a monitor connected to a subsequent stage, outputs the acquired number of the monitors to the monitor connected to the subsequent stage.

Effect of the Invention

According to the multi-monitor of the present invention, at the time of deciding the display size, when information for deciding the display size is input to the monitor at the first stage connected in series, the information is sequentially transferred to the monitor at the subsequent stage. Therefore there is an advantage in that the information for specifying the display size need not be input to each of the plurality of monitors.

EMBODIMENTS FOR CARRYING OUT THE INVENTION

Figure 1:
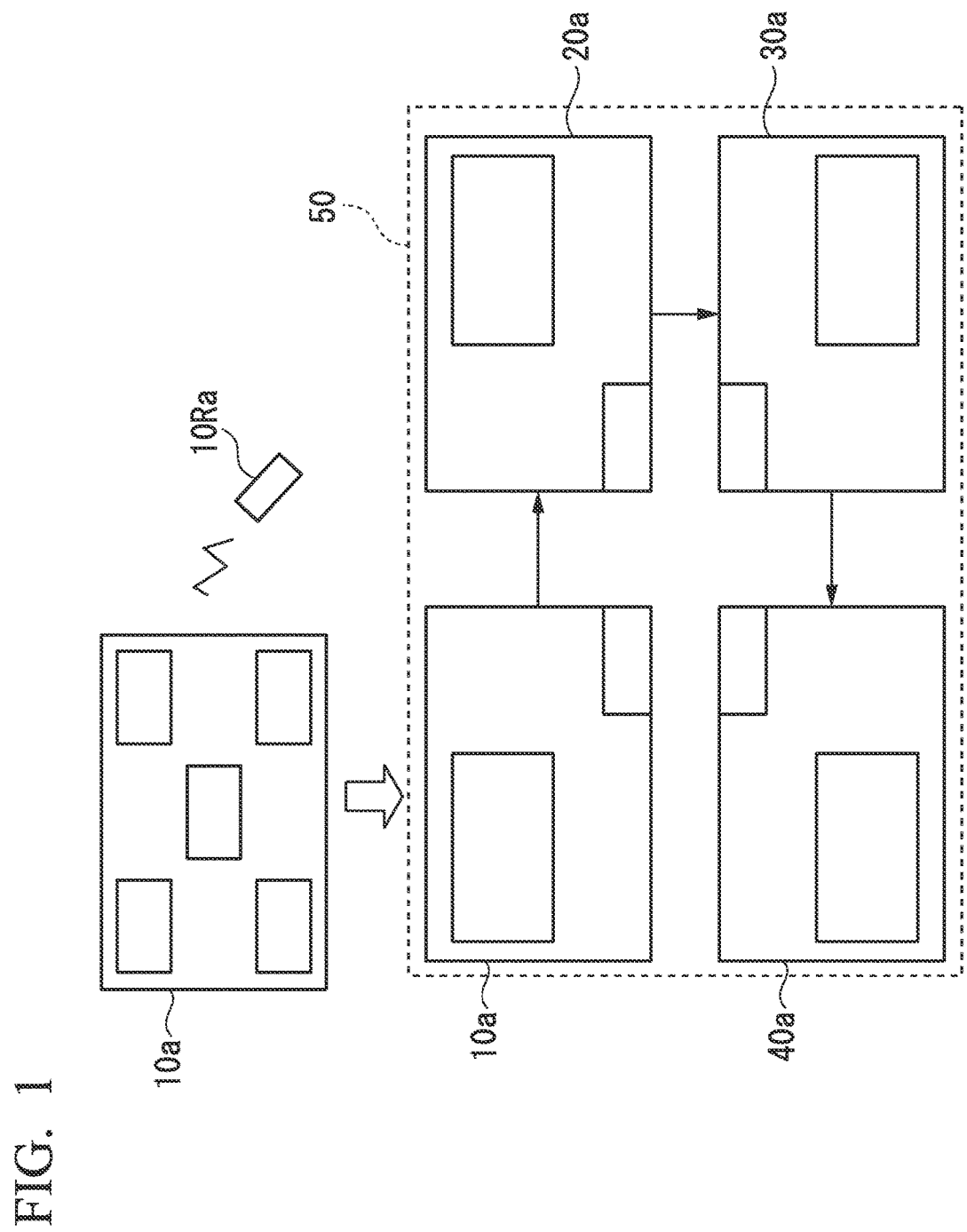
FIG. 1 is a diagram for explaining a multi-connected monitor according to the present exemplary embodiment.

FIG. 1 is a diagram for explaining a multi-connected monitor according to the present exemplary embodiment.

In the present exemplary embodiment, in a multi-monitor, a connection configuration of respective monitors is determined beforehand. Here, a case of a 2×2 multi-connected monitor including 2 monitors in a vertical direction and 2 monitors in a horizontal direction will be described as an example. In the connection configuration of the monitor, the monitors are sequentially communicably connected from an upper left end to a monitor adjacent in a lateral direction, and the monitor at the tail end on the upper stage is communicably connected to the adjacent lower stage. Likewise at the lower stage, the monitor is communicably connected to the adjacent monitor in the lateral direction, and similarly thereafter, and when the connection reaches the tail end at a certain stage, it is communicably connected to the adjacent lower stage, and then connected to the adjacent monitor in the lateral direction.

In this figure, in a multi-monitor 50, four monitors 10a, 20a, 30a, and 40a are multi-connected (connected in series). The monitor 10a is arranged on the upper left side, the monitor 20a is arranged on the right side of the monitor 10a and is communicably connected thereto, the monitor 30a is arranged at a lower stage of the monitor 20a and is communicably connected thereto, and the monitor 40a is arranged on the left side of the monitor 30a and is communicably connected thereto. One image signal is displayed by the four monitors 10a, 20a, 30a, and 40a.

Communication connection between the respective monitors (monitor 10a, monitor 20a, monitor 30a, and monitor 40a) is performed by RS232C communication, Ethernet (registered trademark) communication, wireless communication, or the like.

A remote control 10Ra transmits a signal corresponding to a content operated by a user, to the monitor 10a by remote control communication (wireless communication such as infrared rays). Here, the remote control 10Ra transmits various pieces of information to a monitor allocated to the first stage (a monitor 10 in FIG. 1) of the multi-connected monitors.

Figure 2:
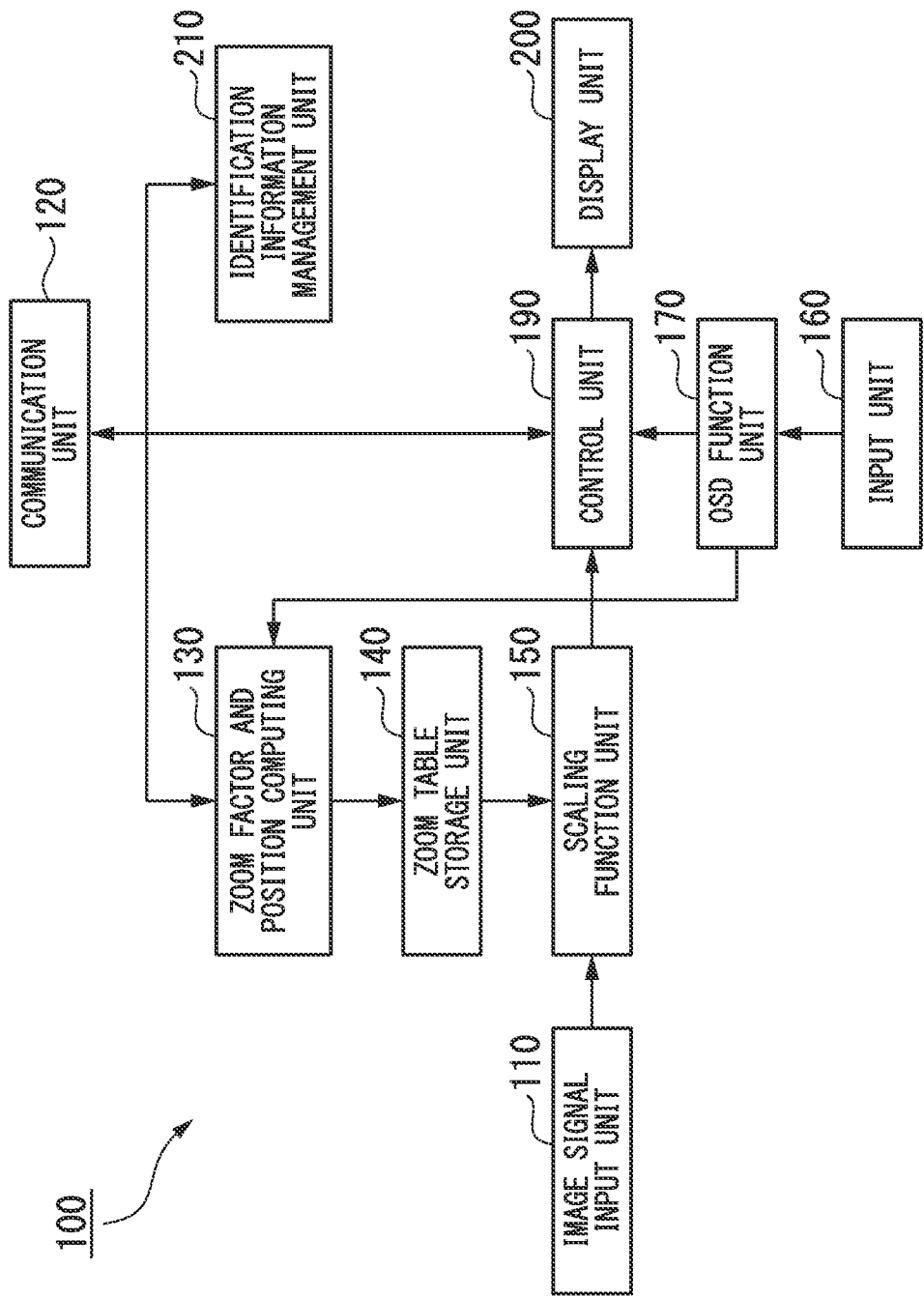
FIG. 2 is a block diagram showing the function of a monitor 100.

The function of a monitor 100 in a multi-connection configuration according to the present exemplary embodiment will be described next. FIG. 2 is a block diagram showing the function of the monitor 100.

An image signal input unit 110 receives an image signal from outside.

A communication unit 120 communicates with the monitors in the multi-connection configuration, and transmits and receives the various pieces of information. The communication is performed by RS232C communication, Ethernet (registered trademark) communication, wireless communication, or the like.

A zoom factor and position computing unit 130 calculates a zoom factor and the position of an image at the time of displaying the image corresponding to the image signal on a display unit 200.

A zoom table storage unit 140 stores various pieces of information according to a calculation result of the zoom factor and position computing unit 130.

A scaling function unit 150 includes a zoomable frame buffer, to scale (scale-up and scale-down) a display size of the image corresponding to the image signal.

An input unit 160 is various operation buttons provided in the monitor.

An OSD function unit 170 displays an OSD screen on the display unit 200 in response to a button operated by the user via the input unit 160.

A control unit 190 displays information received from the communication unit 120, information stored in a connection table storage unit 180, and an image corresponding to the image output from the scaling function unit 150, on the display unit 200, and displays the OSD screen according to an instruction from the OSD function unit 170, on the display unit 200.

An identification information management unit 210 communicates with another multi-connected monitor by the communication unit 120, and allocates identification information for identifying each of the multi-connected monitors, to the own monitor.

Moreover, the identification information management unit 210 can ascertain at which position which monitor is arranged, by also storing the identification information allocated to each monitor.

The respective monitors 10a, 20a, 30a, and 40a include the function of the monitor 100.

Here, the monitor connected to the first stage (here the monitor 10a), of the plurality of monitors, communicates with the respective monitors after the respective monitors are connected to subsequent stages, and allocates the identification information to the respective monitors. Moreover, upon reception of a request to select the number of monitors from the input unit 160, the monitor connected to the first stage displays the OSD screen for inputting the number of connected monitors on a screen of the monitor connected to the first stage. Here, the OSD screen can be displayed only on the monitor at the first stage (FIG. 1). An input to the OSD screen is input from the input unit 160 provided in the monitor at the first stage.

Moreover, until the zoom factor and the position of the own monitor are determined, the monitor at the first stage does not display the input image signal over the entire multi-screen, but can display the image signal only on the own monitor (FIG. 1). By performing the display, the user can consider the position and the size at the time of displaying the image signal on each monitor, while visually confirming the entire image of the image signal.

Figure 3:
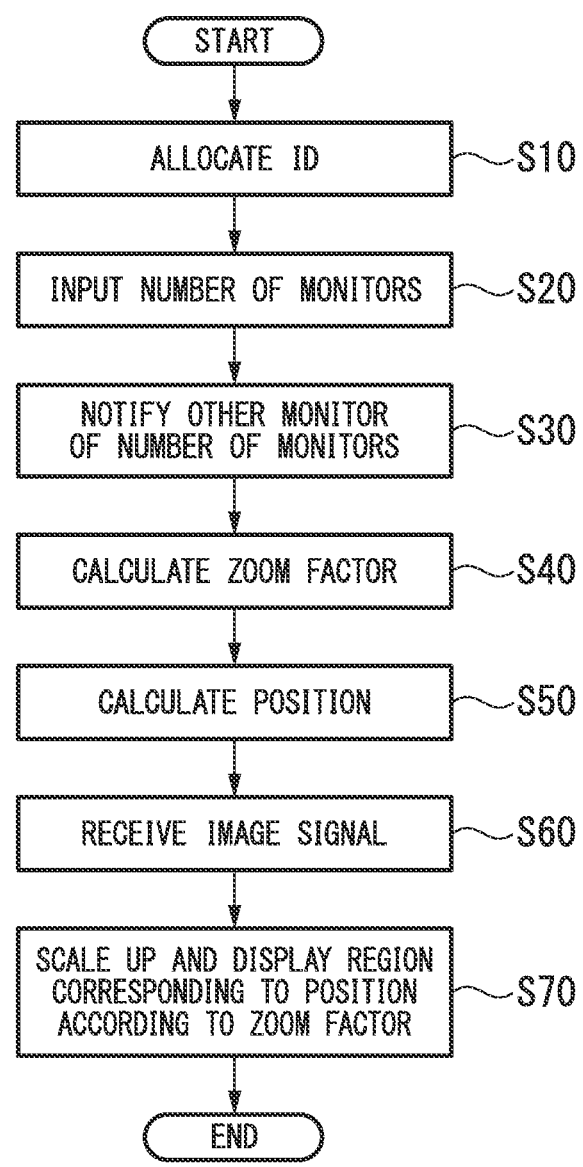
FIG. 3 is a flowchart showing an operation of a monitor at a first stage of the multi-connected monitors.

The operation of the multi-monitor in the above configuration will be described next with reference to FIG. 3. FIG. 3 is a flowchart showing the operation of the monitor at the first stage of the multi-connected monitors.

First, according to the multi-connection configuration determined beforehand, the monitors 10a, 20a, 30a, and 40a are communicably connected as shown in FIG. 1.

Upon completion of multi-connection of the respective monitors, the identification information management unit 210 communicates with other monitors by the communication unit 120, and allocates the identification information (hereunder, also referred to as ID) to the own monitor (step S10). For example, when an allocation instruction of the identification information is input to the monitor 10a via the remote control 10Ra, the identification information management unit 210 communicates with the identification information management unit 210 of the respective monitors to thereby allocate the identification information to the monitors 10a, 20a, 30a, and 40a.

Here, because the connection configuration of the respective monitors is determined beforehand, for example, ID1 is allocated as the identification information to the monitor 10a at the first stage, ID2 is allocated to the monitor 20a at a second stage, ID3 is allocated to the monitor 30a at a third stage, and ID4 is allocated to the monitor 40a at a fourth stage. Here, it can be ascertained at which stage which ID is connected based on the connection configuration (2×2) of the monitors and the number of connected monitors. For example, by allocating the ID so that a value of ID increases by 1, with the monitor at the first stage as a reference, the ID and the stage number correspond to each other, and hence it is possible to ascertain at which stage the monitor is connected based on the ID.

After being multi-connected, upon reception of a request to select the number of monitors from the input unit 160 (Step S20), the monitor 10a starts up an OSD function of the OSD function unit 170 to display the screen for selecting the number of connected monitors on the display unit 200 of the monitor 10a. Here, the number of monitors representing the 2×2 connection configuration is selected and a determination button is pressed. Moreover, input of the number of monitors is performed by the monitor at the first stage.

When the number of monitors (2×2) is determined, the control unit 190 of the monitor 10a communicates with the monitor at the subsequent stage (20a, 30a, and 40a) by the communication unit 120 to thereby notify the number of monitors (2×2) (step S30). For example, the monitor 10 transmits information including the number of monitors representing the 2×2 connection configuration to the monitor 20a, the monitor 20a similarly transmits it to the monitor 30a, and the monitor 30a transmits it to the monitor 40a. In this way, when there is a monitor connected to the subsequent stage, the information of the number of monitors is output to the monitor connected to the subsequent stage. When there is no monitor connected to the subsequent stage, the information is not transmitted thereafter.

Next the zoom factor and position computing unit 130 of the monitor 10a calculates the zoom factor and the position of the image represented by the image signal based on the identification information allocated to the own monitor by the identification information management unit 210, the number of monitors representing the connection configuration acquired by the OSD function unit 170, and a bezel width stored beforehand in the own monitor. For example, because the connection configuration is 2×2 and the number of connected monitors is four, the zoom factor and position computing unit 130 calculates the zoom factor as quadruple (step S40).

Moreover, the zoom factor and position computing unit 130 of the monitor 10a calculates the position from the number of connected monitors, the bezel width, and the identification information (step S50). For example, when the number of connected monitors is four (2×2) and the ID allocated to the own monitor is 1, it acquires, as a computing result, that the position is in a region corresponding to upper left when the image represented by the image signal is divided into four (2 vertically by 2 horizontally). Furthermore, at the time of displaying an upper left region of the image, a range of an actually displayed pixel of the upper left region of the image is determined, taking into consideration a bezel width with other monitors. For example, when the image corresponding to the computed position is displayed, an image deviated by the bezel width is displayed with respect to the adjacent monitor. However, a display region is determined, assuming that the image having a size considering the bezel width up to the adjacent monitor (the size excluded by the bezel width) of the upper left region of the image is displayed. The bezel width is stored beforehand in the zoom factor and position computing unit 130.

Having computed the zoom factor and the position, the zoom factor and position computing unit 130 of the monitor 10a stores the zoom factor and the position in the zoom table storage unit 140, in association with the number of connected monitors, the identification information allocated to the own monitor, and the bezel width.

Moreover, the monitors 20a, 30a, and 40a calculate the zoom factor and the position of the own monitor based on the number of monitors notified from the monitor at the previous stage, and store them in the zoom table storage unit 140.

Subsequently, upon input of the image signal to the respective monitors 10a, 20a, 30a, and 40a, the image signal input unit 110 of the respective monitors receives the image signal (step S60). Upon input of the image signal from the image signal input unit 110, the scaling function unit 150 refers to the zoom table storage unit 140 to read the zoom factor and the position corresponding to the identification information allocated to the own monitor, and scales up the region corresponding to the position according to the zoom factor, for the image represented by the image signal, according to the zoom factor and the position (step S70). The control unit 190 displays the scaled-up image on the display unit 200. The monitor 10a scales up quadruply the upper left region of the image represented by the image signal.

Moreover, the monitors 20a, 30a, and 40a also similarly scale up the region corresponding to the own position, according to the zoom factor, and display it. The monitor 20a scales up an upper right region of the image represented by the image signal by four times and displays it. The monitor 30a scales up a lower right region of the image represented by the image signal by four times and displays it. The monitor 40a scales up a lower left region of the image represented by the image signal by four times and displays it.

As a result, the four monitors 10a, 20a, 30a, and 40a can display the image corresponding to one image signal. Here by only inputting the number of connected monitors to one monitor by using the OSD function of the monitor at the first stage, the zoom factor and the position can be set with respect to the respective monitors.

Figure 4:
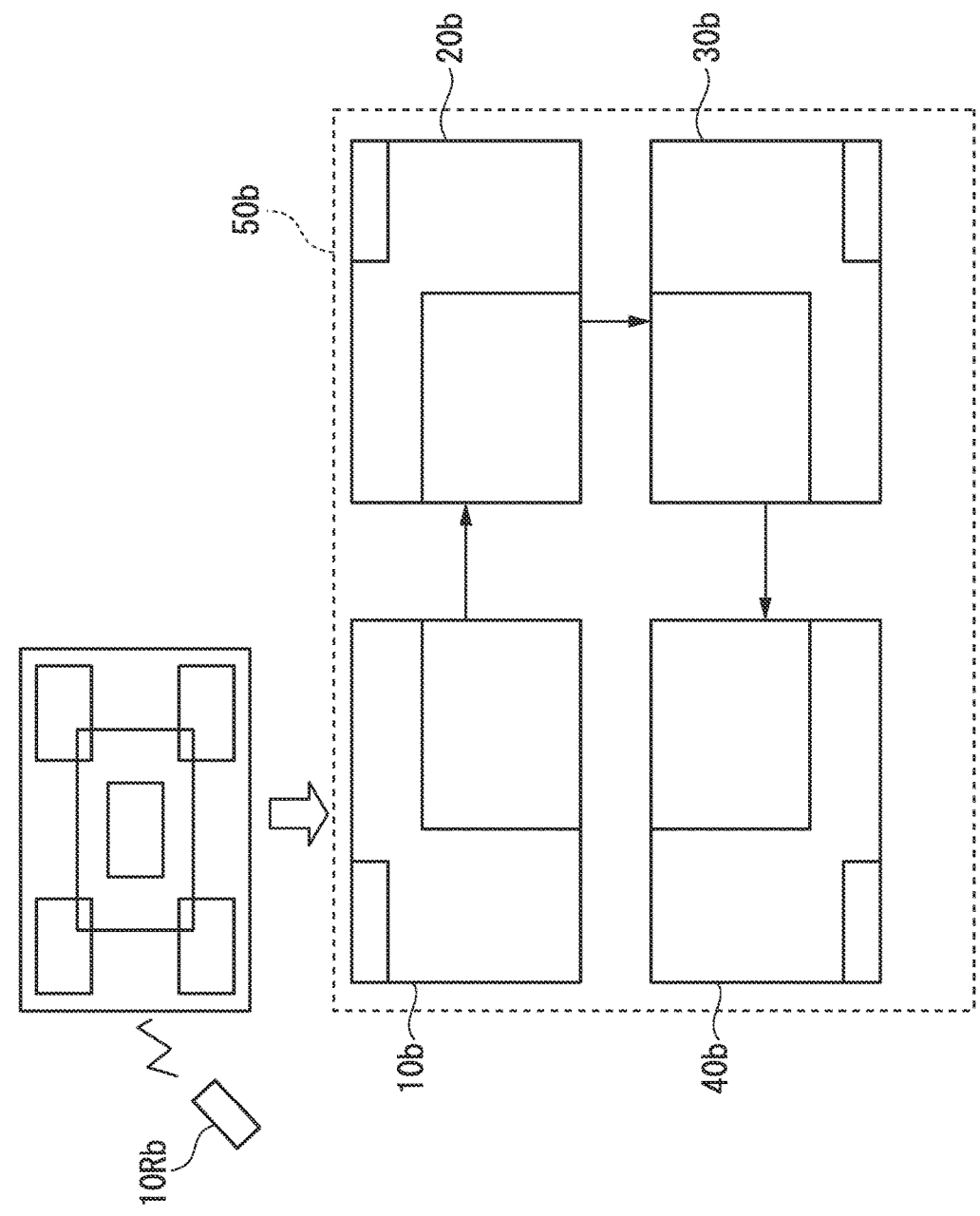
FIG. 4 is a diagram for explaining a second exemplary embodiment

A second exemplary embodiment will be described next. FIG. 4 is a diagram for explaining the second exemplary embodiment. In this exemplary embodiment, the case where zoom display is performed on a multi-monitor by inputting information specifying an arbitrary coordinate on a monitor at the first stage is described. In this figure, as in the first exemplary embodiment, the multi-connection configuration is a 2×2 multi-connection including four monitors. A monitor 10b is arranged on the upper left side, a monitor 20b is arranged on the upper right side, a monitor 30b is arranged on the lower right side, and a monitor 40b is arranged on the lower left side, and the monitors 10b, 20b, 30b, and 40b are communicably connected sequentially.

Figure 5:
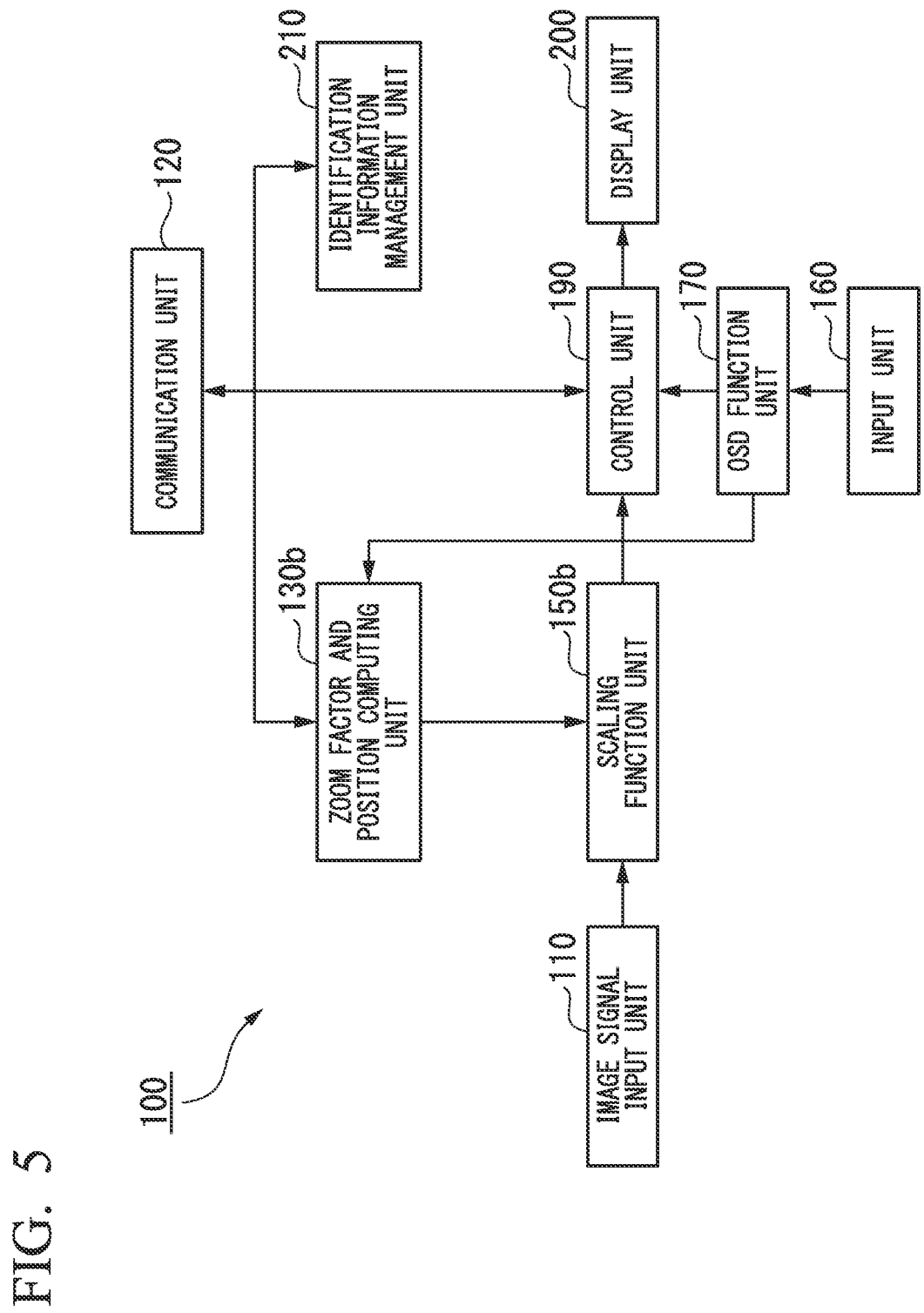
FIG. 5 is a block diagram showing the function of a monitor according to the second exemplary embodiment.

FIG. 5 is a block diagram showing the function of the monitor according to the second exemplary embodiment.

Here, the monitors 10b, 20b, 30b, and 40b are substantially the same as those of the first exemplary embodiment. However, a part of the function is different. Here description of the same configuration is omitted, and different parts thereof are mainly described.

The same functions as those shown in FIG. 2 are denoted by the same reference symbols, and explanation thereof is omitted.

A zoom factor and position computing unit 130b acquires information representing an arbitrary coordinate input from an OSD function unit 170, and based on the coordinate calculates a region to be displayed by the own monitor, of an image corresponding to an image signal, and a zoom factor.

A scaling function unit 150 scales the image corresponding to the image signal input from an image signal input unit 110, according to a calculation result of the zoom factor and position computing unit 130b.

Here, in the second exemplary embodiment, after the respective monitors are connected to subsequent stages, the monitor connected to the first stage (here, the monitor 10b), of a plurality of monitors, communicates with the respective monitors, and allocates identification information to each monitor. Moreover, upon reception of a request to select the number of monitors from an input unit 160, the monitor connected to the first stage displays the OSD screen for inputting the number of connected monitors, on a screen of the monitor connected to the first stage. Here the OSD screen can be displayed only on the monitor at the first stage. An input to the OSD screen is input from the input unit 160 provided in the monitor at the first stage.

Moreover, until the coordinate is input and determined by using the OSD screen, the monitor at the first stage does not display the input image signal over the entire multi-screen, but can display the image signal only on the own monitor. By performing the display, the user can consider the position and the size at the time of displaying the image signal on each monitor, while visually confirming the entire image of the image signal, and can input an arbitrary coordinate.

An operation of the monitor in this exemplary embodiment will be described next.

At first, when the monitors 10b, 20b, 30b, and 40b are connected, an identification information management unit 210 of each monitor communicates with the other monitors by a communication unit 120, and allocates the identification information to the own monitor. Here, the number of monitors are four (2 vertically by 2 horizontally), and the identification information of the monitor 10b being the first stage is ID1, the identification information of the monitor 20b adjacent to its right side is ID2, the identification information of the monitor 30b adjacent to the bottom side of the monitor 20b is ID3, and the identification information of the monitor 40b adjacent to the left side of the monitor 30b is ID4.

Subsequently, when operated by a user, a remote control 10Rb accesses the monitor 10b being the first stage, and transmits the number of monitors (2×2, four monitors) to the monitor 10b. Here the OSD function unit 170 may display a screen for selecting the number of monitors, by using the OSD function, to acquire the number of monitors according to an input of a selection instruction from the input unit 160.

When the number of monitors is determined, the OSD function unit 170 displays a screen for specifying the coordinate, on a display unit 200 by the OSD function. Then the OSD function unit 170 acquires an arbitrary coordinate according to the instruction input from the input unit 160, and outputs it to the zoom factor and position computing unit 130b. The input of the arbitrary coordinate may be a numerical value representing the coordinate, a frame, or a pointer (described later).

<The case Where the Arbitrary Coordinate is Specified by Using a Numerical Value Representing the Coordinate>

In the case where the arbitrary coordinate is specified by using a numerical value representing the coordinate, information representing a horizontal position a representing the position of the coordinate in a horizontal direction at a position on a monitor screen and a vertical position b representing the position of the coordinate in a vertical direction at the position on the monitor screen, and information representing widths (widths C and D), are received from the input unit 160.

Figure 6:
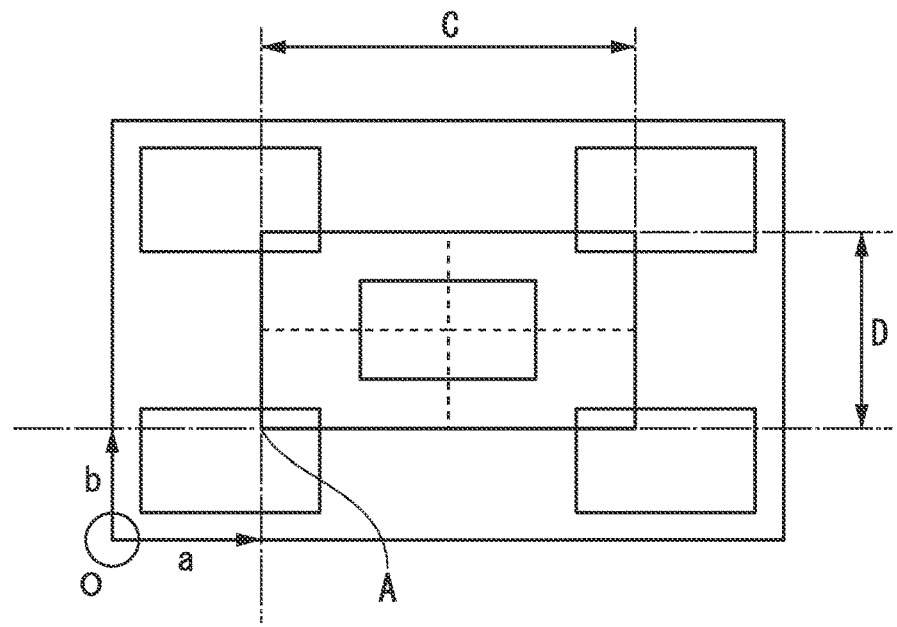
FIG. 6 is a diagram for explaining a case where a coordinate is specified by using a numerical value representing the coordinate.

FIG. 6 is a diagram for explaining a case where a coordinate is specified by using a numerical value representing the coordinate.

The origin O is the leftmost lowest coordinate on the screen of the monitor 10b. The vertical position a and the horizontal position b correspond to a position in the horizontal direction and a position in the vertical direction based on the origin O. A width C, being information representing a width, represents a position of the coordinate in the horizontal direction with a point A (horizontal position a and vertical position b) being reference. A width D, being information representing the width, represents a position of the coordinate in the vertical direction with the point A (horizontal position a and vertical position b) being reference.

(The Case of ID1)

For example, respective coordinates and widths of a region of the image displayed by the monitor 10b when the number of monitors is n×n and the identification information is ID1, can be expressed by the following equations (1) to (4).

$$\text{Horizontal position} = a \quad\quad \text{Equation (1)}$$

$$\text{Width at the horizontal position} = C/n \text{ (dot)} \quad\quad \text{Equation (2)}$$

$$\text{Vertical position} = b + D(n-1)/n \text{ (Line)} \quad\quad \text{Equation (3)}$$

$$\text{Width at the vertical position} = D/n \text{ (Line)} \quad\quad \text{Equation (4)}$$

That is to say, a region determined based on the horizontal width being C/n (dot) and the vertical width being D/n (Line), by using the coordinate (a, (b+D(n−1)/n (Line))) as a point of origin, is a display target region.

Here, dot represents the number of pixels in the horizontal direction, and Line represents the number of lines in the vertical direction.

(The Case of ID2)

For example, respective coordinates and widths of a region of the image displayed by the monitor 20b when the number of monitors is n×n and the identification information is ID2, can be expressed by the following equations (5) to (8).

Horizontal position=a+C/n (dot)  Equation (5)

Width at the horizontal position=C/n (dot)  Equation (6)

Vertical position=b+D(n−1)/n (Line)  Equation (7)

Width at the vertical position=D/n (Line)  Equation (8)

That is to say, a region determined based on the horizontal width being C/n (dot) and the vertical width being D/n (Line), by using the coordinate (a+C/n (dot), (b+D(n−1)/n (Line))) as a point of origin, is a display target region.

(The Case of ID3)

For example, respective coordinates and widths of a region of the image displayed by the monitor 30b when the number of monitors is n×n and the identification information is ID3, can be expressed by the following equations (9) to (12).

Horizontal position=a+C/n (dot)  Equation (9)

Width at the horizontal position=C/n (dot)  Equation (10)

Vertical position=b  Equation (11)

Width at the vertical position=D/n (Line)  Equation (12)

That is to say, a region determined based on the horizontal width being C/n (dot) and the vertical width being D/n (Line), by using the coordinate (a+C/n (dot), b) as a point of origin, is a display target region.

(The case of ID4)

For example, respective coordinates and widths of a region of the image displayed by the monitor 40b when the number of monitors is n×n and the identification information is ID4, can be expressed by the following equations (13) to (16).

Horizontal position=a  Equation (13)

Width at the horizontal position=C/n (dot)  Equation (14)

Vertical position=b  Equation (15)

Width at the vertical position=D/n (Line)  Equation (16)

That is to say, a region determined based on the horizontal width being C/n (dot) and the vertical width being D/n (Line), by using the coordinate (a, b) as a point of origin, is a display target region.

When the coordinate (a, b) is specified in the manner described above, the monitor 10b transfers the specified coordinate (a, b) to the monitor 20b. Moreover, the specified coordinate (a, b) is transferred from the monitor 20b to the monitor 30b, and then transferred to the monitor 40b. In this way, if there is a monitor connected to the subsequent stage, information representing an arbitrary coordinate is output to the monitor connected to the subsequent stage. If there is no monitor connected to the subsequent stage, the information is not transmitted thereafter.

Then a control unit 190 of each monitor (monitors 20b, 30b, and 40b) respectively calculates the position and the width from the number of connected monitors, and performs zoom display, matched with the panel resolution. Here, the respective monitors 10b, 20b, 30b, and 40b respectively store the panel resolution of the own monitor in a memory in the control unit 190.

At the time of performing the calculation, by calculating the position and the width by taking the bezel width information into consideration, an image is displayed so as not to expand by the bezel width between the adjacent monitors.

<The Case Where the Arbitrary Coordinate is Specified by Using a Pointer>

Figure 7:
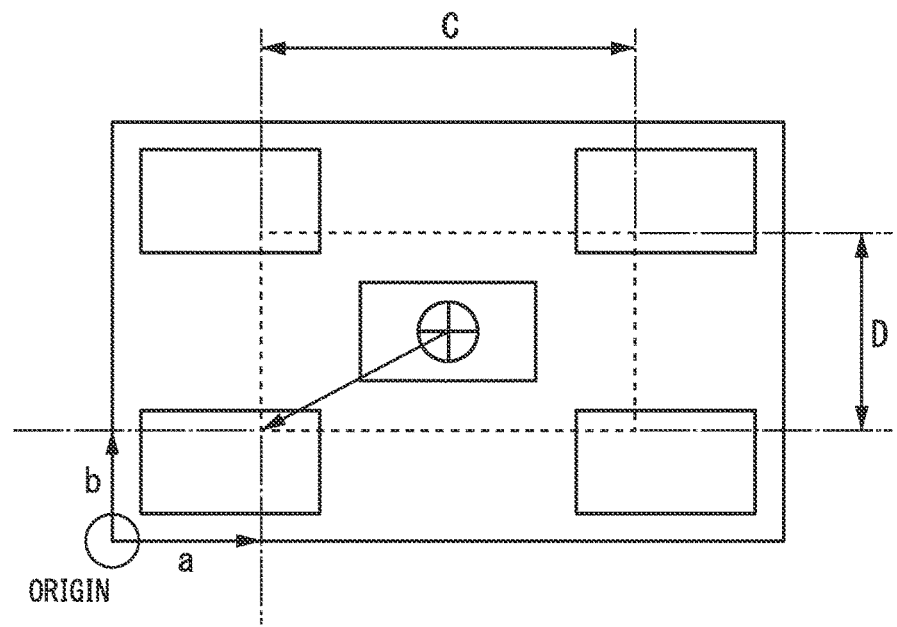
FIG. 7 is a diagram for explaining a case where a coordinate is specified by using a pointer.

FIG. 7 is a diagram for explaining the case where the arbitrary coordinate is specified by using a pointer.

A pointer is displayed on the monitor screen by the OSD function of the OSD function unit 170. The pointer can move from side to side and up and down according to an operation content by operating the input unit 160 provided in the monitor. Here, a zoom width is determined beforehand.

When the position of the pointer is determined according to an instruction from the input unit 160, zoom display is performed by designating the position of the pointer as a center, the horizontal width as C, and the vertical width as D. Here, the coordinate (a, b) is obtained based on the position of the pointer, the width C, and the width D, and a region to be displayed by each monitor can be determined in the same manner when the arbitrary coordinate is specified by using the numerical value representing the coordinate described above.

A third exemplary embodiment is described next.

Figure 8:
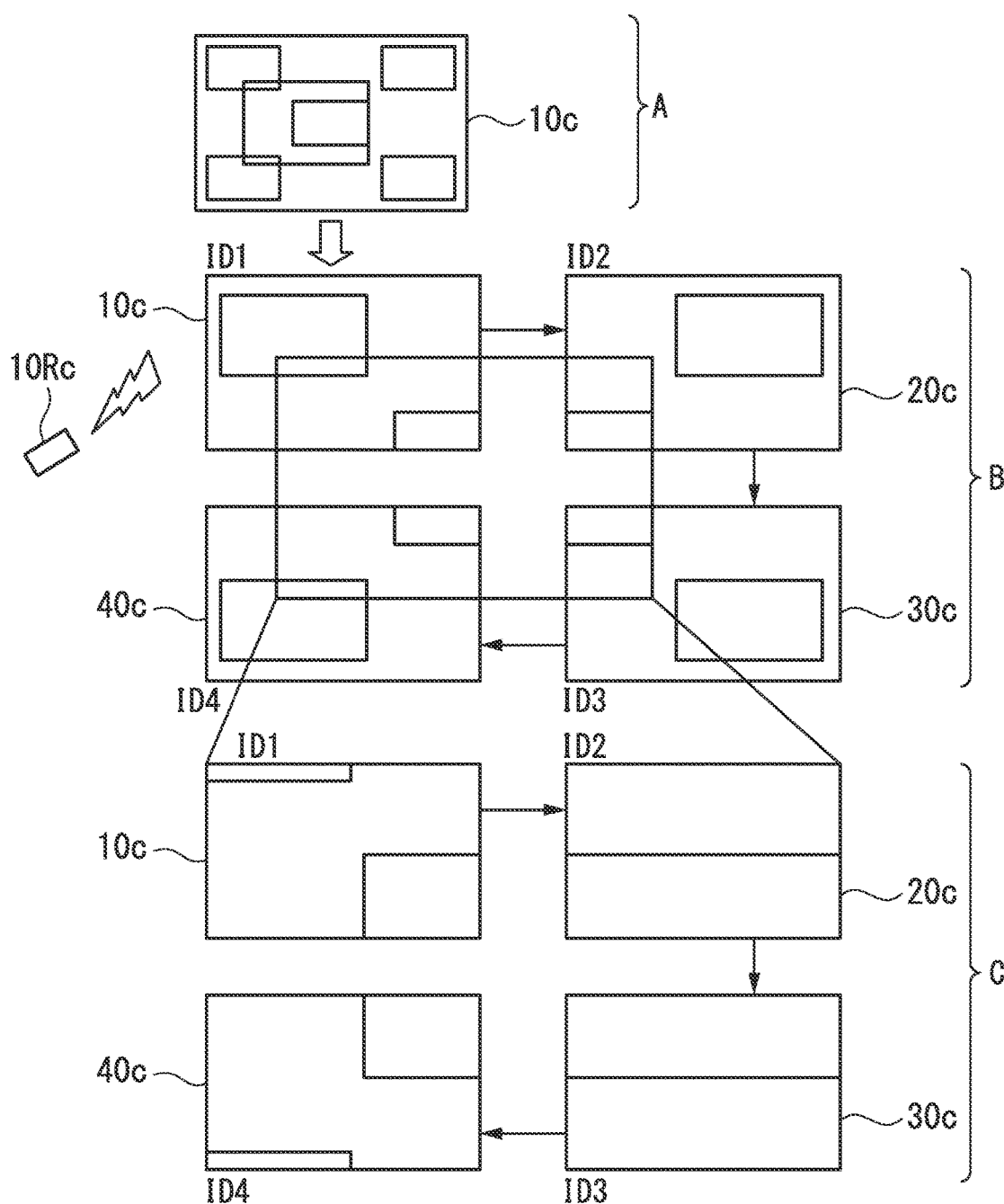
FIG. 8 is a diagram for explaining a third exemplary embodiment.

FIG. 8 is an explanatory diagram of the third exemplary embodiment.

In the first and second exemplary embodiments, the case where various specifications are performed in an image displayed on a representative monitor (the monitor at the first stage) in the multi-connection configuration has been described. In the third exemplary embodiment, zoom-up and zoom-down is executed at an arbitrary position on a multi-screen with respect to an image zoom-displayed on the multi-screen in the multi-connection configuration according to the first or second exemplary embodiment.

At first, as in the first or second exemplary embodiment, a remote control 10Rc or an input unit 160 by an OSD function unit 170 accesses a monitor 10c with an identification number ID1 to perform coordinate specification on the multi-screen. Coordinate information at this time is transferred by communication via a monitor 20c (ID2) connected to the monitor 10c, a monitor 30c (ID3), and a monitor 40c (ID4). For example, according to the first or second exemplary embodiment, a region to be enlarged is specified on a screen of the monitor 10c (reference symbol A).

As in the second exemplary embodiment, the respective monitors (monitors 20c, 30c, and 40c) calculate the position to be displayed on the own monitor based on a coordinate position transferred from the monitor at the previous stage, and display the position by a frame or a pointer by the OSD (reference symbol B). The frame or the pointer displayed by the OSD at this time can be displayed over two or more monitors. In FIG. 8, a case where one OSD is displayed over four monitors (monitors 20c, 30c, and 40c) is shown. Then zoom-up is performed at the specified coordinate and displayed (reference symbol C).

Moreover, zoom-down is realized also by moving an image position and setting magnification beforehand in multi-connection after zoom-up by using the frame or the pointer specified in a step of reference symbol B.

Figure 9:
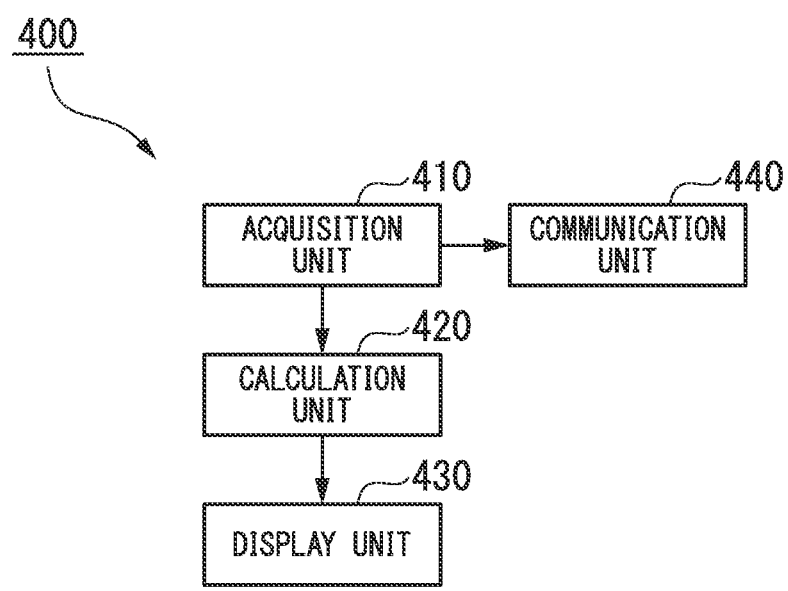
FIG. 9 is a diagram for explaining a fourth exemplary embodiment.
Figure 10:
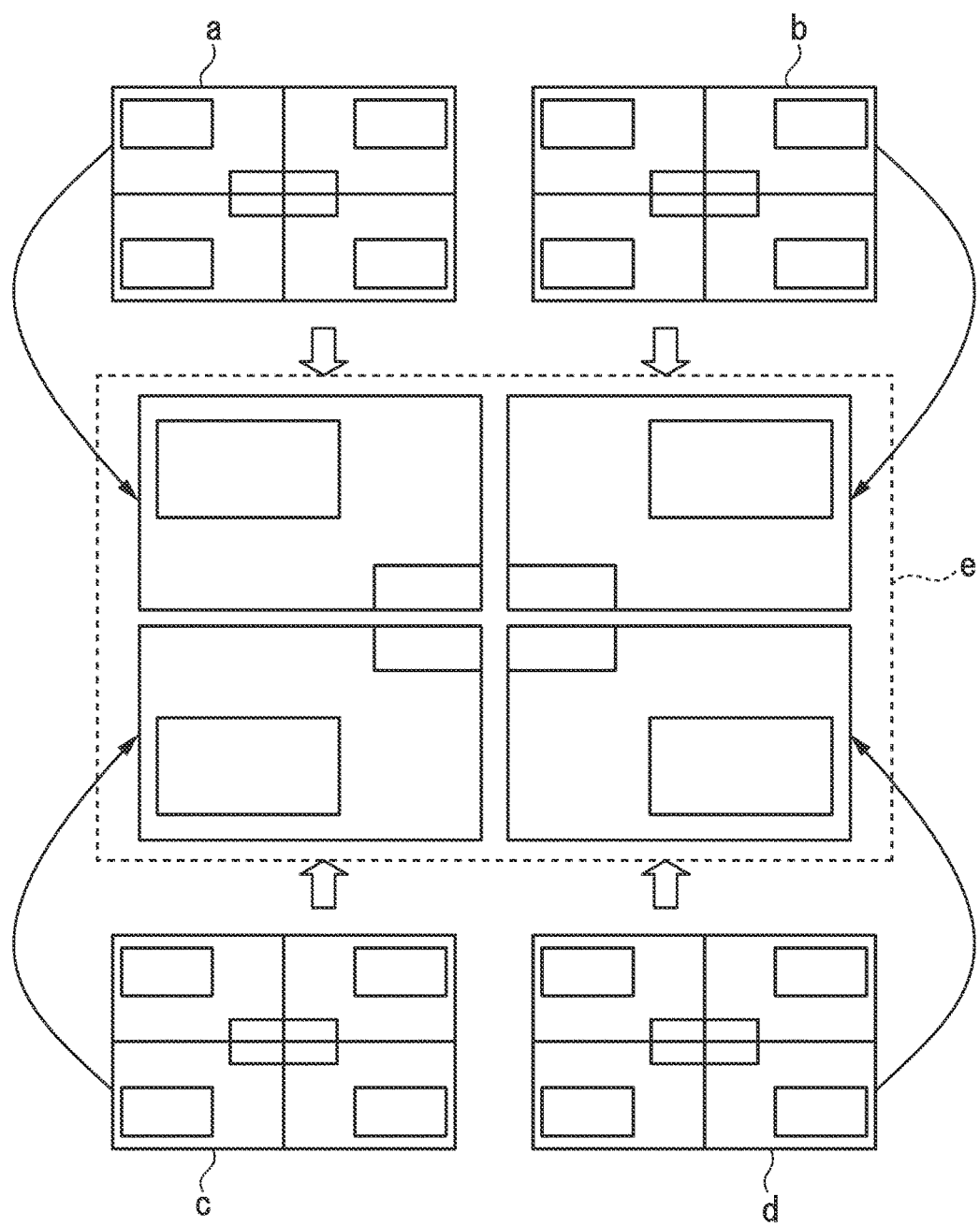
FIG. 10 is a diagram for explaining a configuration of a multi-monitor.

A fourth exemplary embodiment is described next. FIG. 9 is a block diagram representing a function of a monitor 400.

The monitor 400 is a monitor device that can serially connect a plurality of monitors including a first monitor and monitors other than the first monitor. An acquiring unit 410 acquires the number of monitors connected in series, from outside or from a monitor connected to a previous stage. A calculation unit 420 calculates a region to be displayed by the own monitor, of an image corresponding to an image signal, and a display size for displaying the image of the region by the own display unit, based on the number of monitors acquired by the acquiring unit 410 and the arrangement of the own monitor at the time of serial connection. A display unit 430 displays the image of the region described above according to the display size. When there is a monitor connected to a subsequent stage, a communication unit 440 outputs the acquired number of monitors to the monitor connected to the subsequent stage.

In this way, by transmitting the number of monitors input to the monitor at the first stage to the monitor at the subsequent stage, then even in the monitor at the subsequent stage, the region and the display size of the image signal to be displayed by the own monitor can be calculated according to the information of the number of monitors and the arrangement of the own monitor at the time of serial connection, thereby enabling to display the image signal on the own display unit.

In the first to third exemplary embodiments described above, the case where multi-connection is 2×2 (four monitors) has been described. However, the monitors may be multi-connected according to the arrangement of 9 monitors of 3×3, 16 monitors of 4×4, 25 monitors of 5×5, or the like.

According to the above described exemplary embodiments, because an instruction relating to zoom is input to the monitor at the first stage and the instruction is sequentially transferred to the monitor at the subsequent stage, zoom setting of the multi-connected monitors can be performed collectively, and hence, shortening of time becomes easy.

Moreover, zoom-up and zoom-down of an arbitrary place can be collectively performed by using the pointer or the frame on the multi-connected screen, giving rise to an effect in view of a new function and usability.

Conventionally, when a preset grid-like pattern is selected, only zoom display at a determined coordinate can be performed. By contrast, according to the above described exemplary embodiments, zoom display can be performed at a coordinate other than the determined coordinate, by specifying an arbitrary coordinate.

A program for realizing the function of the monitor in FIG. 2, FIG. 5, and FIG. 9 may be recorded in a computer readable recording medium, and the program recorded in the recording medium may be read and executed by a computer system, thereby changing the display size. The "computer system" referred to herein includes hardware such as an OS and a peripheral device.

Moreover, the "computer system" includes a website providing environment (or a display environment) in the case of using a WWW system.

Furthermore, the "computer readable recording medium" stands for portable media such as a flexible disk, a magnetooptic disk, a ROM, and a CD-ROM, or a storage device such as a hard disk incorporated in the computer system. Furthermore, the "computer readable recording medium" includes a medium that holds a program for a certain period of time such as a volatile memory in the computer system, which becomes a server or a client. Moreover, the above program may realize a part of the functions described above and may realize the functions described above in combination with a program recorded beforehand in the computer system. Furthermore, the above program may be stored in a predetermined server and distributed (downloaded or the like) via a communication line according to a request from other devices.

The exemplary embodiments of the present invention have been described with reference to the drawings. However, the specific configuration is not limited to the exemplary embodiments, and designs or the like that do not depart from the scope of the present invention are included.

REFERENCE SYMBOLS 10a, 20a, 30a, 40a, 10b, 20b, 30b, 40b, 10c, 20c, 30c, 40c, 100, 400 Monitor
10Ra, 10Rb, 10Rc Remote control
50 Multi-monitor
110 Image signal input unit
120, 440 Communication unit
130, 130b Zoom factor and position computing unit
140 Zoom table storage unit
150, 150b Scaling function unit
160 Input unit
170 OSD function unit
190 Control unit
200, 430 Display unit
210 Identification information management unit
410 Acquisition unit
420 Calculation unit

The invention claimed is:

1. A multi-monitor comprising a plurality of monitors connected in series, the monitors including first, second, and third monitors,
wherein the monitors collectively display one image by displaying mutually different regions of the one image, respectively,
wherein the first monitor includes:
a first acquisition unit that acquires a number of the monitors, an image signal including all of the one image, and a position of a pointer, from outside;
a first calculation unit that calculates a first region to be displayed by the first monitor, of the one image included in the image signal, and a first zoom factor of a first image corresponding to the first region, based on the number of the monitors, arrangement of the first monitor in the serial connection, and the position of the pointer;
a first display unit that displays the first image according to the first zoom factor such that the monitors display the one image with the position of the pointer being a center; and
a first communication unit that outputs the number of the monitors, the image signal including all of the one image, and the position of the pointer to the second monitor arranged at a subsequent stage of the first monitor, and
wherein the second monitor includes:
a second acquisition unit that acquires the number of the monitors, the image signal including all of the one image, and the position of the pointer output by the first communication unit of the first monitor;

a second calculation unit that calculates a second region to be displayed by the second monitor, of the one image included in the image signal, and a second zoom factor of a second image corresponding to the second region, based on the number of the monitors, arrangement of the second monitor in the serial connection, and the position of the pointer;

a second display unit that displays the second image according to the second zoom factor such that the monitors display the one image with the position of the pointer being the center; and a second communication unit that outputs the number of the monitors, the image signal including all of the one image, and the position of the pointer to the third monitor arranged at a subsequent stage of the second monitor.

2. The multi-monitor according to claim 1, wherein the monitors form a multi-monitor screen, wherein the first monitor receives a change instruction indicating change of a display size of the one image when the multi-monitor screen displays an On-Screen Display (OSD) screen and the one image, and wherein the monitors change the display size of the one image, according to the change instruction.

3. The multi-monitor according to claim 1, wherein the monitors form a multi-monitor screen, wherein the first monitor receives a change instruction indicating change of a display size of the one image when the multi-monitor screen displays the one image and only the first monitor displays an On-Screen Display (OSD) screen, and wherein the monitors change the display size of the one image, according to the change instruction.

4. The multi-monitor according to claim 1, wherein the first monitor further includes a storage unit that stores the first region and the first zoom factor calculated based on the number of the monitors and the arrangement of the first monitor, and wherein the second monitor further includes a storage unit that stores the second region and the second zoom factor calculated based on the number of the monitors and the arrangement of the second monitor.

5. The multi-monitor according to claim 1, wherein the first display unit displays the first image scaled up according to the first zoom factor, and wherein the second display unit displays the second image scaled up according to the second zoom factor.

6. The multi-monitor according to claim 1, wherein each of the first and second zoom factors corresponds to the number of the monitors.

7. The multi-monitor according to claim 1, wherein the first display unit displays the first image whose size is scaled according to the first zoom factor, and wherein the second display unit displays the second image whose size is scaled according to the second zoom factor.

8. The multi-monitor according to claim 1, further comprising:

an On-Screen Display (OSD) function unit that displays an OSD screen on the first display unit, an OSD function of the OSD function unit displaying the pointer on the monitors.

9. The multi-monitor according to claim 8, wherein a region displayed by each of the monitors is determined by an arbitrary coordinate that is specified by the pointer.

10. The multi-monitor according to claim 1, wherein the mutually different regions of the one image are determined by an arbitrary coordinate that is specified by the pointer.

11. A monitor device that is one of a plurality of monitors connected in series, the monitors collectively displaying one image by displaying mutually different regions of the one image, respectively, the monitor device comprising:

an acquisition unit that acquires a number of the monitors, an image signal including all of the one image, and a position of a pointer;

a calculation unit that calculates a region to be displayed by the monitor device, of the one image included in the image signal, and a zoom factor of an image corresponding to the region, based on the number of the monitors, arrangement of the monitor device in the serial connection, and the position of the pointer;

a display unit that displays the image corresponding to the region according to the zoom factor such that the monitors display the one image with the position of the pointer being a center; and a communication unit that outputs the number of the monitors, the image signal including all of the one image, and the position of the pointer to one of the monitors when the one of the monitors is arranged at a subsequent stage of the monitor device.

12. The monitor device according to claim 11, wherein the monitor device further includes a storage unit that stores the region and the zoom factor calculated based on the number of the monitors and the arrangement of the monitor device in the serial connection.

13. The monitor device according to claim 11, wherein the display unit displays the image scaled up according to the zoom factor.

14. The monitor device according to claim 11, wherein the display unit displays the image whose size is scaled according to the zoom factor.

15. A display method for a multi-monitor, the multi-monitor including a plurality of monitors connected in series, the monitors collectively displaying one image by displaying mutually different regions of the one image, respectively, the monitors including first, second, and third monitors, the display method comprising:

acquiring, by the first monitor, a number of the monitors, an image signal including all of the one image, and a position of a pointer, from outside;

calculating, by the first monitor, a first region to be displayed by the first monitor, of the one image included in the an image signal, and a first zoom factor of a first image corresponding to the first region, based on the number of the monitors, arrangement of the first monitor in the serial connection, and the position of the pointer;

displaying, by the first monitor, the first image according to the first zoom factor such that the monitors display the one image with the position of the pointer being a center;

outputting, by the first monitor, the number of the monitors, the image signal including all of the one image, and the position of the pointer to the second monitor arranged at a subsequent stage of the first monitor;

acquiring, by the second monitor, the number of the monitors, the image signal including all of the one image, and the position of the pointer output by the first monitor;

calculating, by the second monitor, a second region to be displayed by the second monitor, of the one image included in the image signal, and a second zoom factor of a second image corresponding to the second region, based on the number of the monitors, arrangement of the second monitor in the serial connection, and the position of the pointer;

displaying, by the second monitor, the second image according to the second zoom factor such that the monitors display the one image with the position of the pointer being the center; and outputting, by the second monitor, the number of the monitors, the image signal including all of the one image, and the position of the pointer to the third monitor arranged at a subsequent stage of the second monitor.

16. The display method according to claim 15, wherein the first monitor displays the first image whose size is scaled according to the first zoom factor, and wherein the second monitor displays the second image whose size is scaled according to the second zoom factor.

* * * * *